US008386909B2

(12) United States Patent
Lin

(10) Patent No.: US 8,386,909 B2
(45) Date of Patent: Feb. 26, 2013

(54) CAPTURING AND PRESENTING INTERACTIONS WITH IMAGE-BASED MEDIA

(75) Inventor: I-Jong Lin, Half Moon Bay, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2436 days.

(21) Appl. No.: 11/100,663

(22) Filed: Apr. 7, 2005

(65) Prior Publication Data

US 2006/0230332 A1  Oct. 12, 2006

(51) Int. Cl.
*G06F 17/21* (2006.01)
*G06F 17/22* (2006.01)

(52) U.S. Cl. ........................ 715/200; 715/723

(58) Field of Classification Search ................. 715/203, 715/200
See application file for complete search history.

(56) References Cited

U.S. PATENT DOCUMENTS

| | | | | |
|---|---|---|---|---|
| 4,715,818 | A | * | 12/1987 | Shapiro et al. ................. 434/118 |
| 4,785,472 | A | * | 11/1988 | Shapiro ...................... 379/93.19 |
| 5,270,820 | A | | 12/1993 | Fellinger |
| 5,528,263 | A | | 6/1996 | Platzker et al. |
| 5,686,957 | A | * | 11/1997 | Baker ............................. 348/36 |
| 5,833,468 | A | * | 11/1998 | Guy et al. ...................... 434/350 |
| 6,361,173 | B1 | | 3/2002 | Vlahos et al. |
| 6,512,507 | B1 | | 1/2003 | Furihata et al. |
| 6,542,087 | B2 | | 4/2003 | Lin |
| 6,595,781 | B2 | | 7/2003 | Sutton |
| 6,775,518 | B2 | * | 8/2004 | Norcott et al. ................ 434/350 |
| 6,789,903 | B2 | | 9/2004 | Parker et al. |
| 6,829,394 | B2 | | 12/2004 | Hiramatsu |
| 7,660,510 | B2 | * | 2/2010 | Kawahara et al. ............. 386/281 |
| 2002/0136455 | A1 | | 9/2002 | Lin et al. |
| 2003/0122954 | A1 | * | 7/2003 | Kassatly ...................... 348/335 |
| 2004/0205478 | A1 | | 10/2004 | Lin et al. |
| 2005/0289453 | A1 | * | 12/2005 | Segal et al. ................... 715/512 |
| 2006/0245600 | A1 | * | 11/2006 | Chung ............................ 381/82 |
| 2011/0300527 | A1 | * | 12/2011 | Epstein ......................... 434/365 |

OTHER PUBLICATIONS

Spalter et al., reusable Hypertext Structures for Distance and JIT Learing, 2000, ACM, pp. 29-38.*
Nishimoto et al,"A Proposal for a Framework for General Multimedia Art Creation Instruments", ACM, 1999, pp. 108-115.*
Mann et al., "Painting with Looks: Photographic Images from Video Using Quantimetric Processing", 2002, ACM, pp. 117-126.*
I-Jong Lin, "Active shadows: real-time video segmentation within a camera-display space," HP Labs: 10th Bay Area Vision Meeting (Mar. 4, 2004).
Nelson L.Chang, "Efficient dense correspondences using temporally encoded light patterns," PROCAMS-2003 (2003).
"Presentation products with motion picture technology," iMatte (Oct. 8, 2004).

* cited by examiner

*Primary Examiner* — Doug Hutton, Jr.
*Assistant Examiner* — James Debrow

(57) ABSTRACT

In one aspect, images of a person's interactions with images presented on a display are captured. The person's interactions are segmented from the presented images in the captured images. A multimedia data object is generated. The multimedia data object includes a presentation media object containing digital representations of the presented images, an image presence media object containing the segmented interactions of the person, and at least one link synchronizing the presentation media object and the image presence media object.

31 Claims, 7 Drawing Sheets

Capture Plane (76) → Warp → Presentation Plane (66)

CAPTURING AND PRESENTING INTERACTIONS WITH IMAGE-BASED MEDIA

BACKGROUND

A person may interact with image-based media in a variety of different ways. For example, one common way for a person to convey information to others is by interacting with images (e.g., slides of a slideshow presentation) that are presented on a display. In some cases, the images may be presented by a computer-controlled projection system that includes a computer that generates image data and a projector that projects the image data onto a projection screen. A person may interact with the projected images by pointing to notable areas of the projected images with a finger, laser pointer, or some other pointing device or instrument.

During a presentation, a person's interactions with the presented images augments a presentation with additional information. For example, by providing additional context and meaning spoken words together with gestures pointing out particular areas of interest in the presented images expand the total information conveyed beyond the information that is summarized in the presented images. This additional information may be captured in video and audio recordings of the person's interactions with the presented images. These recordings, however, have several drawbacks. For example, the resolution of the video recording may be insufficient to allow users to discern features in the projected images. In addition, portions of various ones of the presented images may be obscured by the person's body during his or her interactions with the images.

Rather than passively record a person's interactions with image-based media, other systems have been designed to interpret a person's interactions with images that are presented on a display. For example, some presentation systems include a camera that captures images of a person's interactions with the images that are presented on a display. The presentation system processes the captured images to determine the location of a particular object (e.g., a finger, a hand, or a pointing device) or to determine the intended meanings associated with particular movements, gestures, or configurations of the person's body. The results of these interpretations may be used to control the presentation on the display.

SUMMARY

In one aspect, the invention features a method in accordance with which images of a person's interactions with images presented on a display are captured. The person's interactions are segmented from the presented images in the captured images. A multimedia data object is generated. The multimedia data object includes a presentation media object containing digital representations of the presented images, an image presence media object containing the segmented interactions of the person, and at least one link synchronizing the presentation media object and the image presence media object.

The invention also features a machine-readable medium storing machine-readable instructions for causing a machine to implement the above-described method and a system for implementing the above-described method.

Other features and advantages of the invention will become apparent from the following description, including the drawings and the claims.

DETAILED DESCRIPTION

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

The embodiments that are described in detail below enable a person's interactions with image-based media to be captured and his or her presence with respect to the image-based media to be flexibly encapsulated in a multimedia data object that may be exploited in a wide variety of different application environments to enhance a user's experience with the image-based media. Some embodiments encapsulate a person's interactions that augment image-based media with visual and verbal annotations in a multimedia data object that preserves the person's interactions with the image-based media without losing any information contained in the image-based media.

Other embodiments allow a user to experience the encapsulated presence of the person in a remote setting, thereby enabling an enhanced joint interaction and collaboration between the person and the user with the image-based media. For example, in some implementations, a multimedia data object encapsulating the presence of a local person is generated quickly enough that a remote user watching a presentation of the multimedia object can send feedback to the local person in real time. This feedback can either be in the form of changes to the digital media object that reflect the interactions of the remote user with an input device (e.g., a computer) or in the form of an object encapsulating the presence of the remote user that is combined with the original multimedia object into a joint multimedia object that may be presented to the local person.

Figure 1:
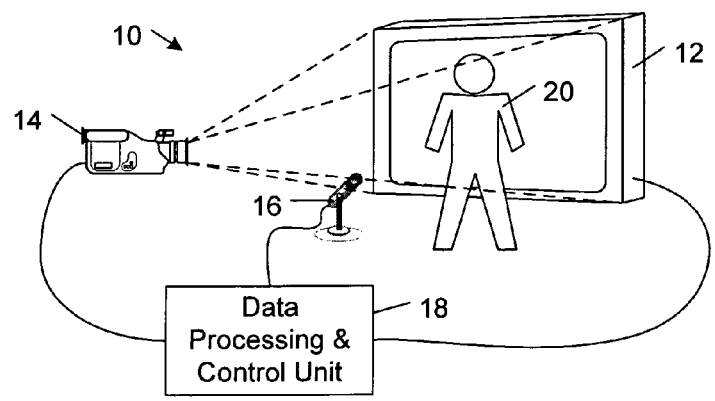
FIG. 1 is a diagrammatic view of an embodiment of an image-based media interaction capture system that includes a display, an image recording device, a sound recording device, and a data processing and control unit.

FIG. 1 shows an embodiment of an image-based media interaction capture system 10 that includes a display 12, an image recording device 14, an audio recording device 16, and a data processing and control unit 18. As explained in detail below, the image-based media interaction capture system 10 captures interactions of a person 20 with one or more images that are presented on the display 12 and encapsulates these interactions along with the one or more images in a multimedia data object, which may be utilized in a wide variety of different application environments.

The display 12 may be any type of display that is capable of presenting images, including a light-emitting display and a light-reflecting display. Among the exemplary types of light-emitting displays are LED-based display screens and plasma display screens. Among the exemplary types of light-reflecting displays are projection screens, which are designed to reflect light that is projected from one or more light projectors. In the illustrated embodiment, the display 12 is a remote-controlled light-emitting display. In other embodiments, the display may be a projection screen that is arranged to receive images that are projected from one or more remote-controlled light projectors.

The image recording device 14 may be any type of imaging device, including a computer-controllable digital camera and a video camera. USB video cameras or "webcams" generally capture images 30 fps (frames per second) at 320×240 resolution, while Firewire video cameras can capture at higher frame rates and/or resolutions. The image recording device 14 typically remains fixed in place and is oriented toward the display 12. Some embodiments may include more than one image recording device.

The audio recording device 16 may be any type of device that is capable of recording sounds that are produced in the vicinity of the display 12, including wired and wireless microphones. The audio recording device 16 may be fixed in position or it may be attached to the person 20. Some embodiments may include more than one audio recording device.

The data processing and control unit 18 may be implemented by any type of processing system that is capable of (1) choreographing the presentation of images on the display 12 with the capture of images by the image recording device 14, (2) receiving image and audio data from the image recording device 14 and the audio recording device 16, and (3) generating from the received data a multimedia data object that encapsulates the person's interactions with images presented on the display 12 together with the one or more presented images in a multimedia data object, as described in detail below. In some embodiments, the data processing and control unit 18 is implemented by a computer (e.g., a workstation computer, a desktop computer, or a laptop computer).

Figure 2:
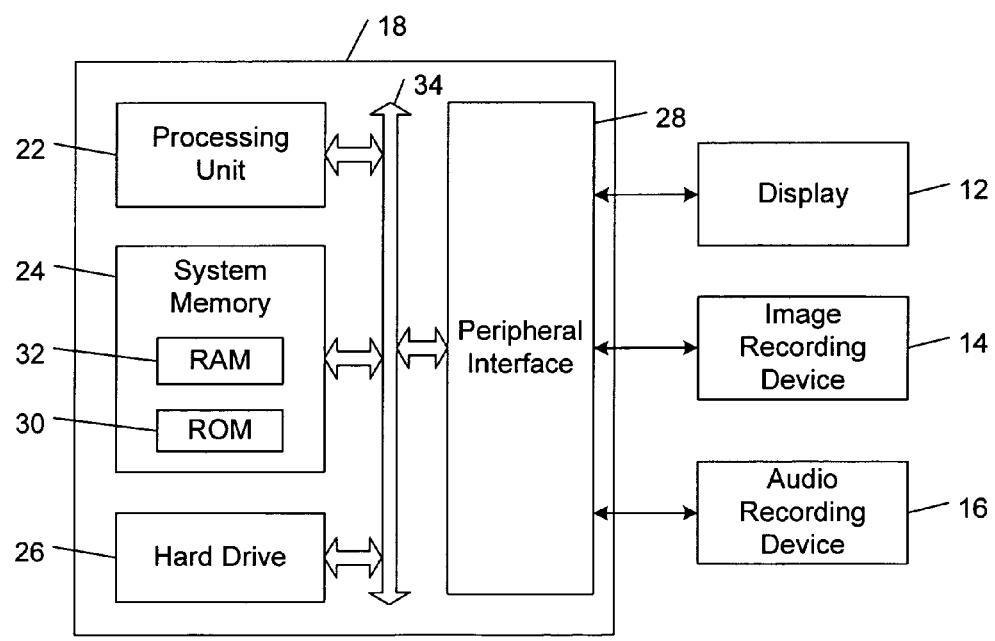
FIG. 2 is a block diagram of an implementation of the data processing and control unit shown in FIG. 1.

FIG. 2 shows an implementation of the data processing and control unit 18 that includes a processing unit 22, a system memory 24, a hard drive 26, and a peripheral interface 28. The processing unit 22 may include one or more processors, each of which may be in the form of any one of various commercially available processors. Generally, each processor receives instructions and data from a read-only memory and/or a random access memory. The system memory 24 includes a read only memory (ROM) 30 that stores a basic input/output system (BIOS) that contains start-up routines for the computer, and a random access memory (RAM) 32. A system bus 34 couples the processing unit 22 to the various components of the data processing and control unit 18. The system bus 34 may be a memory bus, a peripheral bus or a local bus, and may be compatible with any of a variety of bus protocols, including PCI, VESA, Microchannel, ISA, and EISA. The hard drive 26 is connected to the system bus 34 by an interface. The hard drive 26 contains one or more computer-readable media disks that provide non-volatile or persistent storage for data, data structures and computer-executable instructions. Other computer-readable storage devices (e.g., floppy drives, CD ROM drives, magnetic tape drives, flash memory devices, and digital video disks) also may be used with the data processing and control unit 18. The peripheral interface 28 includes one or more cards that provide sockets and other hardware and firmware support for interconnections between the data processing and control unit 18 and the display 12, the image recording device 14, and the audio recording device 16.

Figure 3:
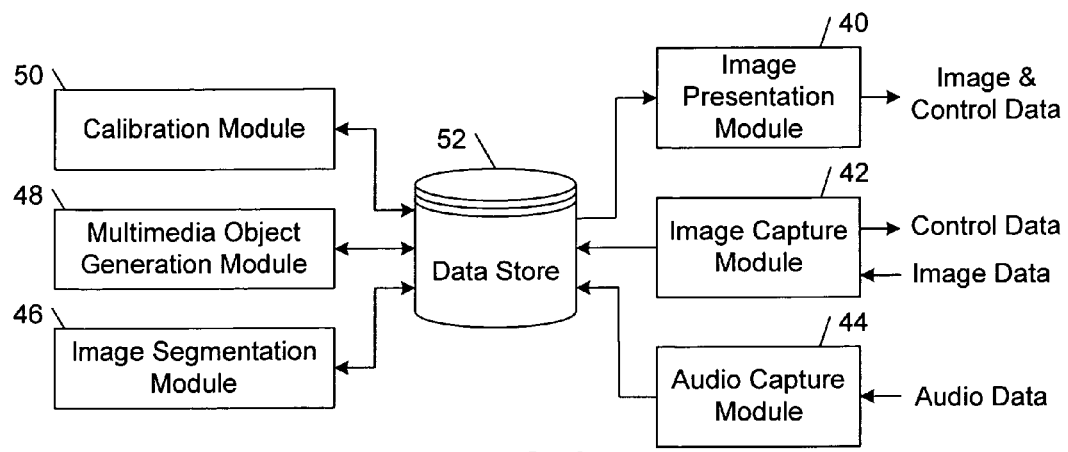
FIG. 3 is a block diagram showing the flow of data through an implementation of the data processing and control unit shown in FIG. 1.

Referring to FIG. 3, in some embodiments, the various functionalities of the data processing and control unit 18 are provided by an image presentation module 40, an image capture module 42, an audio capture module 44, an image segmentation module 46, a multimedia object generation module 48, and a calibration module 50. In general, the modules 40-50 may be implemented in any computing or processing environment, including in digital electronic circuitry or in computer hardware, firmware, or software. In the illustrated embodiments, these modules 40-50 are implemented by one or more software modules that are executed on the data processing and control unit 18. As explained in detail below, the image presentation module 40, the image capture module 42, and the audio capture module 44 control and/or receive data from the display 12, the image recording device 14, and the audio recording device 16. The image segmentation module 46 segments the person's interactions from the image data received from the image recording device 14. The multimedia object generation module 48 generates a multimedia object that incorporates the segmented interaction data that is generated by the image segmentation module 46. The calibration module 50 generates a correspondence mapping between the capture plane of the image recording device 14 and the coordinate system of the display 12 or the coordinate system of a projector that projects images onto the display 12, depending on the implementation of the display 12. A data store 52 contains the various data that are received, generated, and shared by the modules 40-50.

Figure 4:
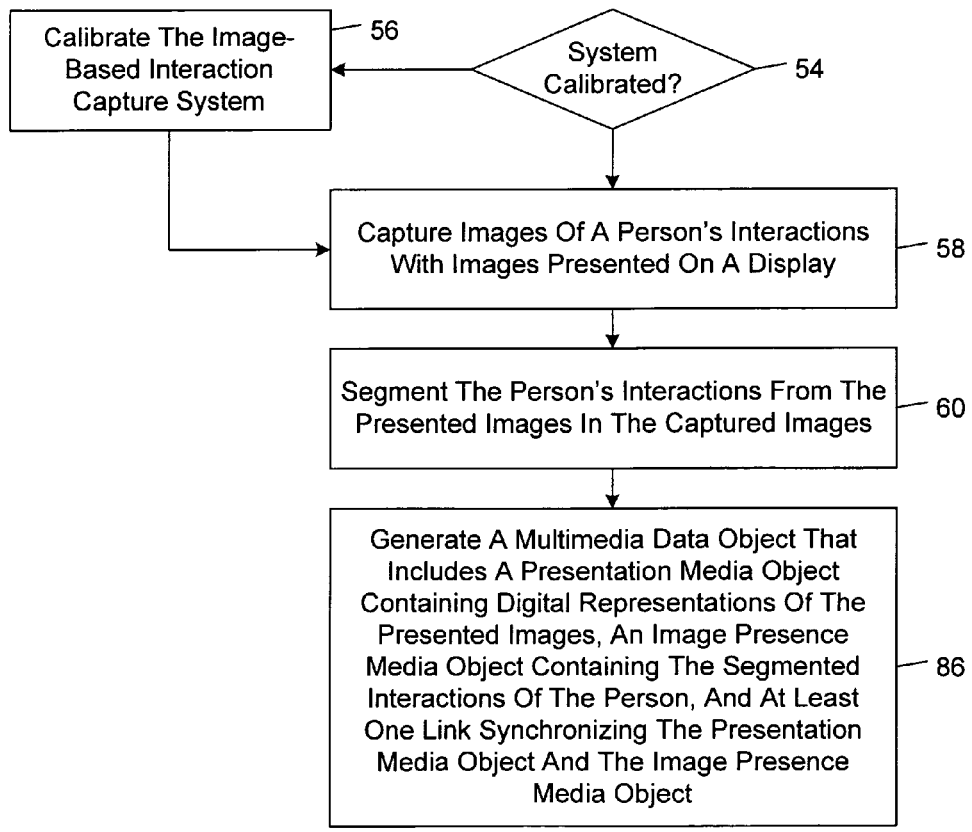
FIG. 4 is a flow diagram of an embodiment of a method of capturing a person's interactions with an image-based media object.
Figure 5:
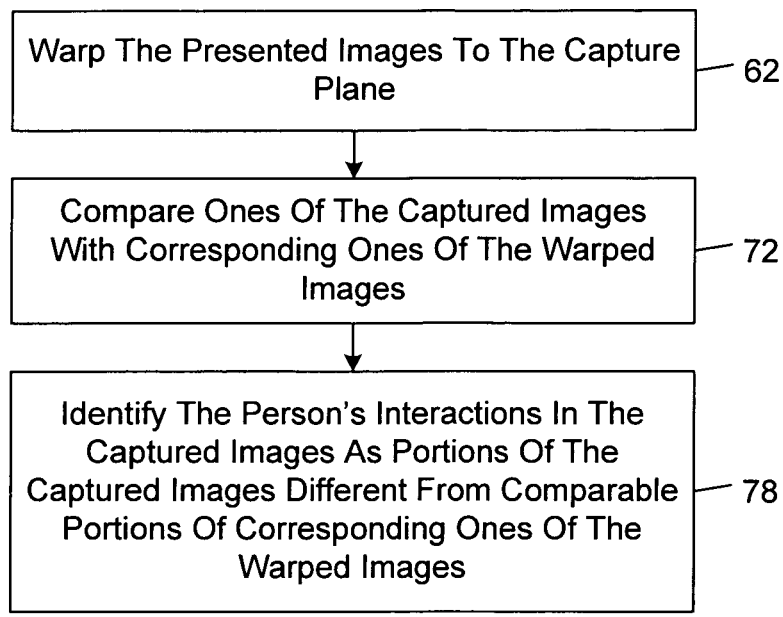
FIG. 5 is a flow diagram of an embodiment of a method of segmenting a person's interactions from presented images in a set of captured images.

FIG. 4 shows a flow diagram of an embodiment of a method by which the data processing and control unit 18 captures the interactions of the person 20 with one or more images that are presented on the display 12 and generates a multimedia data object that includes representations of the captured interactions and the presented images.

If it already has been calibrated (block 54), the data processing and control unit 18 proceeds by executing the image capture process in block 58 of FIG. 4. Otherwise, the data processing and control unit 18 initiates a self-calibration process (block 56). In this regard, the image presentation module 40 transmits a set of coordinate calibration images for presentation on the display 12. In some implementations, the calibration images include a calibration object (e.g., a blob or other feature) at different respective locations. The image recording device 14 captures the calibration images emitted by or reflected from the display 12 and transmits these images to the image capture module 42, which stores the received images in the data store 52.

The calibration module 50 generates a correspondence mapping $F(x,y)=(u,v)$, which maps the calibration object locations (x,y) in either the plane of the display 12 (when the display is a light-emitting display) or the projection plane of a projector (when the display is a light-reflecting display) to corresponding calibration object locations (u,v) of the images captured at the capture plane of the image recording device 14. The locations of the calibration object in the display plane or the projection plane are determined from the image data that are used to generate the presented images. The locations of the calibration object in the captured images are determined by searching for the calibration object in a predetermined area of the captured images corresponding to the display 12. The predetermined display area may be determined in a variety of different ways. In one approach, a known test pattern is presented on the display, a perspective transform that is computed based on the known test pattern, and a correspondence mapping is derived from the computed perspective transform. The predetermined display area is determined from the correspondence mapping.

After the system 10 has been calibrated, the data processing and control unit 18 captures images of the person's interactions with images that are presented on the display 12 (block 58). In this process, the image presentation module 40 transmits image data and control data for presentation on the display and the image capture module 42 transmits to the image recording device 14 control data that causes the image recording device 14 to begin recording images of a scene that encompasses the display 12. The image recording device 14 transmits the recorded images to the image capture module 42, which stores the received image recordings in the data store 52. During this time, the audio recording device 16 transmits recordings of the sounds captured in the vicinity of the display 12 to the audio capture module 44, which stores the received audio recordings in the data store 52.

Figure 6:
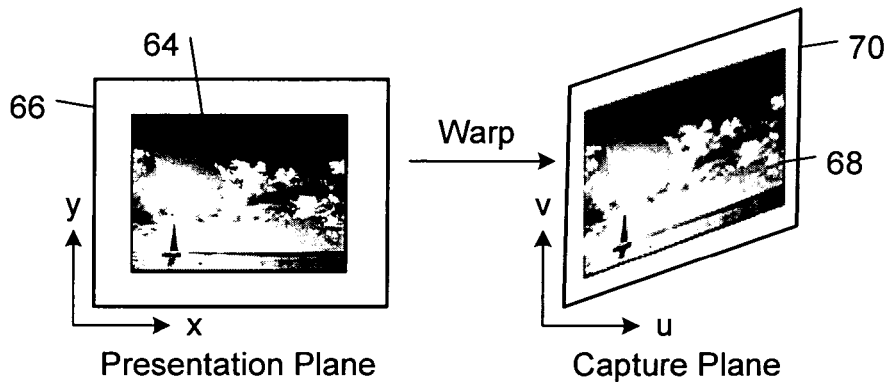
FIG. 6 is a diagrammatic view of an image being warped from a presentation plane to a capture plane.
Figure 7:
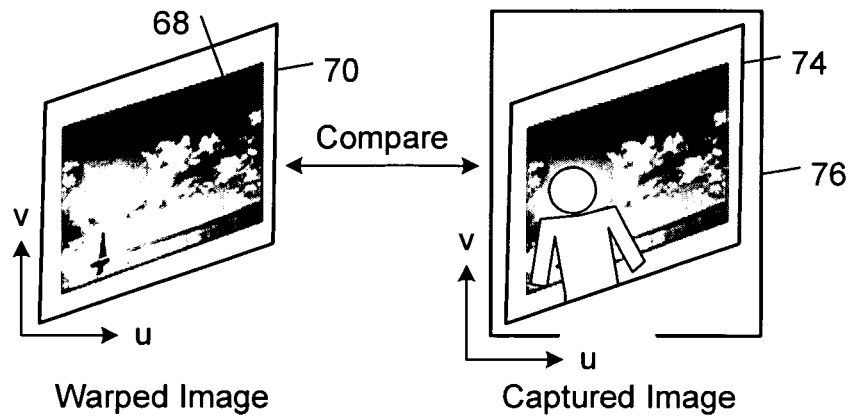
FIG. 7 is a diagrammatic view of the warped image shown in FIG. 6 being compared with a corresponding image that was captured in the capture plane.

Referring to FIGS. 4, 5, 6, and 7, the data processing and control unit 18 segments the person's interactions from the presented images in the images that were captured by the image recording device 14 (block 60). In this regard, the image segmentation module 46 processes the captured images that are stored in the data store 52. In particular, the image segmentation module 46 uses the correspondence mapping F(x,y)=(u,v), which was generated by the calibration module 50, to transforms the presented images to the capture plane of the image recording device 14 (block 62). As shown in FIG. 6, the presented image 64 in the presentation plane 66 appears undistorted, whereas the warped image 68 in the capture plane 70 may appear distorted when the viewpoint of the image recording device does not lie on the orthogonal axis of the display 12.

In general, the image segmentation module 46 determines the parts of the display in the captured images that are occluded (e.g., by the person or an object carried by the person). In one embodiment, the image segmentation module 46 compares ones of the captured images with corresponding ones of the warped images (block 72). In this process, the image segmentation module 46 compares coordinate regions of one or more pixels in the warped images 68 in the capture plane 70 to corresponding coordinate regions in the predetermined display area 74 in the corresponding captured images 76. The image segmentation module 46 identifies the person's interactions in the captured images 76 as portions of the captured images 76 that are different from comparable portions of corresponding ones of the warped images (block 78). In some implementations, the image segmentation module 46 computes the magnitude of the difference $\delta(u_i,v_i)$ between corresponding intensity values in the warped images 68 and the captured images 76. That is, $$\delta(u_i,v_i)=\|\text{warped\_image}(u_i,v_i)-\text{captured\_image}(u_i,v_i)\| \qquad (1)$$

The coordinate regions in the captured images 76 that are associated with difference values that exceed a threshold are identified as part of the person's interactions. The threshold typically is a constant and may be determined based on the lighting conditions, the nature of the presented images, and the parameters of the image recording device 14.

Figure 8:
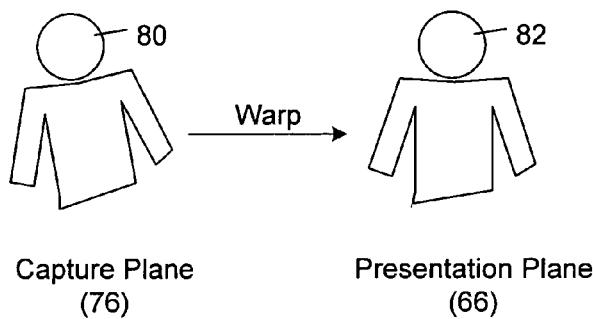
FIG. 8 is a diagrammatic view of a segmented image of a person's interactions being warped from a capture plane to a presentation plane.

As shown in FIG. 8, in some implementations, the image segmentation module 46 warps the person's segmented interactions 80 in the capture plane 76 to warped segmented interactions 82 in the presentation plane 66. In this process, the image segmentation module 46 uses the inverse of the transform that was generated by the calibration module 50 (i.e., $F^{-1}(u,v)=(x,y)$).

Figure 9:
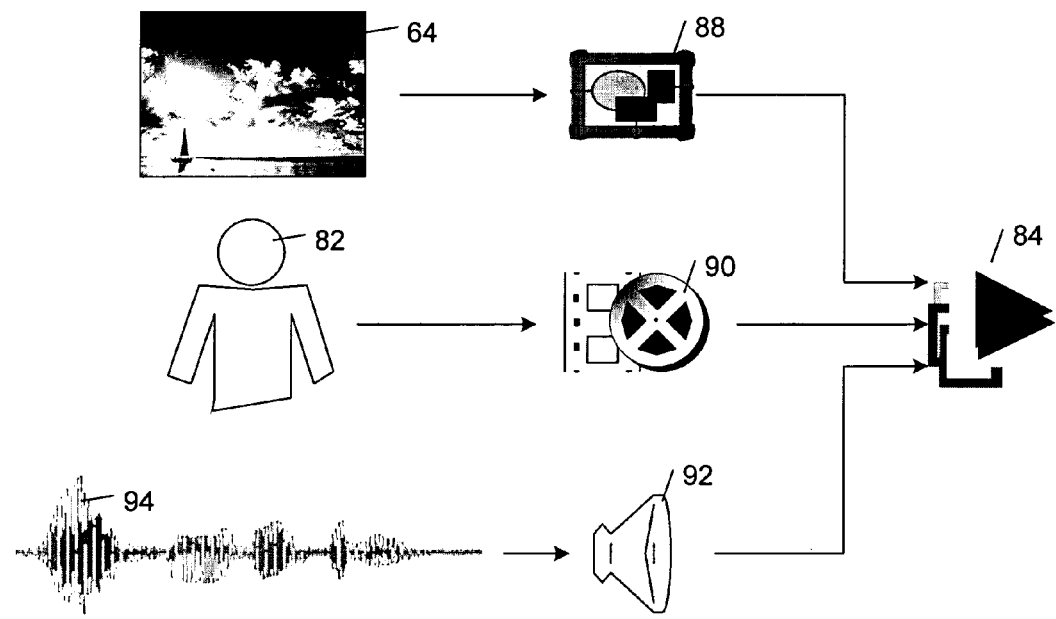
FIG. 9 is a diagrammatic view of the elements of a presentation media object, an image presence media object, and an audio presence media object being encapsulated in a multimedia data object.

Referring to FIGS. 4 and 9, after the person's interactions have been segmented by the image segmentation module 46 (block 60), the multimedia object generation module 48 generates a multimedia data object 84 (block 86). The multimedia data object 84 contains a presentation media object 88 that contains digital representations of the presented images 64, and an image presence media object 90 that contains the segmented interactions 82 of the person 20. In some implementations, the multimedia data object 84 also contains an audio presence media object 92 that contains a digital representation of the audio recordings 94 that were captured by the audio recording device 16. The presentation media object 88 may correspond to a digital file in the original format used to create the presented images (e.g., a slide presentation file format, such as power point), or an image-based file format (e.g., MPEG, motion-JPEG, or JPEG). The image presence media object 90 may correspond to a digital file in an image-based file format (e.g., MPEG, motion-JPEG, or JPEG). The audio presence media object 92 may correspond to a digital file in an audio-based file format (e.g., DVF, MSV, WAV, and MP3).

The multimedia data object 84 additionally includes at least one link for synchronizing the presentation media object 88, the image presence media object 90, and (if present) the audio presence media object 92. The synchronization links choreograph the rendering of these objects with respect to a common time reference. In some implementations, the time reference may be provided by synchronized timestamps that are associated with the constituent elements of the objects 88, 90, 92.

In some embodiments, the multimedia data object 84 may be a SMIL 2.0 (Synchronized Multimedia Integration Language) file that contains a link to the presentation media object 88, the image-presence media object 90, and the audio presence media object 92, as well as data specifying the rendering parameters for these objects 88, 90, 92 and indications of relative rendering locations and times of these objects 88, 90, 92. In other embodiments, the multimedia data object 84 may be in a streaming file format that includes multiple synchronized, overlayed replayable, bitstreams representing the real-time presentation of the images in the display 12, the segmented person's interactions, and the audio recordings captured by the audio recording device 16.

As explained above, the multimedia data object 84 may be used in a wide variety of different application environments to enhance a user's experience with the image-based media. For example, by embedding the local user's interaction within the multimedia data object 84 in real-time, some implementations allow a remote user to interact directly with a local user either by 1) directly interacting with digital media via a mouse and keyboard or 2) using the same technology to embed himself/herself in the same multimedia data object 84 and interact with the digital version of the local user.

In the first scenario, the remote and local users may be a teacher and a student, or a computer support technician and a customer, respectively. In the first case, the teacher may appear live overlaid on top of a computerized lesson plan in the presentation to the student. In this presentation, the teacher may lead the student through the lesson by indicating which buttons to press or indicating the correct answer if the student chose the wrong answer via his/her mouse. In the second case, the technical support person may appear live overlaid on top of customer's desktop in the presentation to the customer. In this presentation, the technical support person may, for example, lead the customer person to start up their web browser, download a driver, and install it correctly.

In the second scenario, an implementation of the image-based media interaction capture system 10 may be presented in each of the local and remote locations. In one exemplary application, a presenter in the local location may give a presentation to one or more persons in the remote location. A person in the remote location who wanted to question the presenter, for example, may stand up in front of the display in the remote location, ask his/her question and supplement his/her question with interactions with the current presentation. The remote image-based media interaction capture system encapsulates the questioner's presence in a multimedia data object and sends the multimedia data object for presentation to the presenter in the local location. The local image-based media interaction capture system may encapsulate the presenter's response to the remote person's question in a multimedia data object and send the multimedia data object for presentation at the remote location, whereby the questioner would receive the answer to his/her question.

Figure 10:
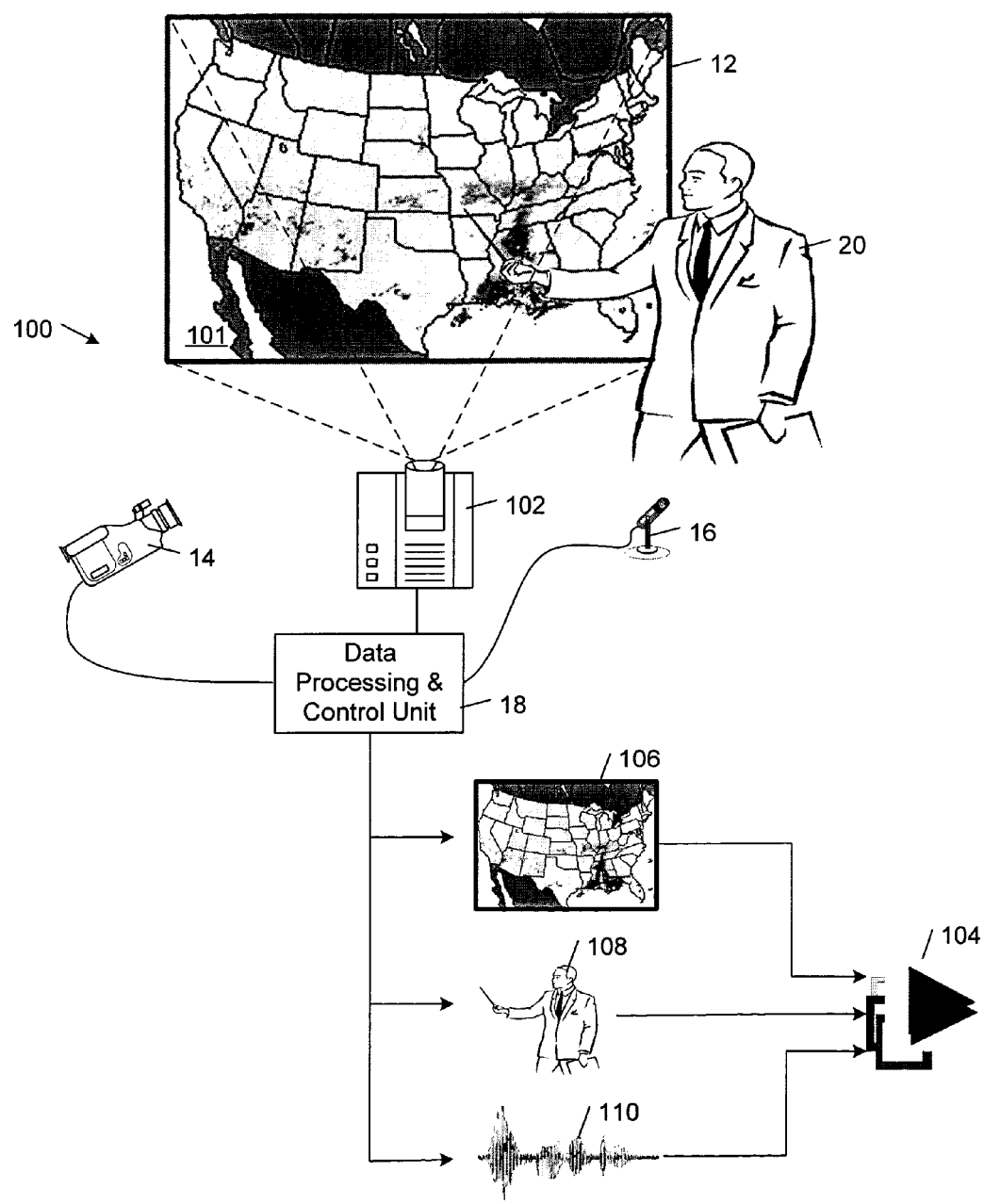
FIG. 10 is a diagrammatic view of an embodiment of an image-based media interaction capture system encapsulating a person's annotations to images presented on a display.

FIG. 10 shows an embodiment of an image-based media interaction capture system 100 that is configured to encapsulate a person's annotations to images 101 that are presented on the display 12. In this embodiment, the display 12 is a projection screen that is oriented to receive the images 101 that are projected by a projector 102. In operation, the person 20 (e.g., a weatherman) interacts with a series of images (e.g., weather maps and other weather-related images). Because the person 20 can see the projected images 101 on the display 12, the person 20 is able to interact seamlessly with the presented images 101. For example, the person 20 can accurately describe and point to locations of interest synchronously with the different images that are projected on the screen without having to refer to a separate screen that presents a composite image of the person 20 and the projected images as is required with blue-screening techniques.

The image-based media interaction capture system 100 captures the person's interactions with the projected images 101 and encapsulates these interactions along with the presented images 101 in a multimedia data object 104. In this process, the image segmentation module 46 segments the person's interactions from the images captured by the image recording device 14. The multimedia object generation module 48 incorporates into the multimedia data object 104 a presentation media object 106 that contains digital representations of the presented images, an image presence media object 108 that contains the segmented interactions with the presented images 101, and an audio presence media object 110 that contains a digital representation of the audio recordings captured by the audio recording device 16.

The resulting multimedia data object 104 may be rendered in a wide variety of different local and remote settings. In some implementations, the presentation media object 106 preserves the original resolution of the presented images. In these implementations, the multimedia data object 104 may be rendered to provide a high-definition presentation of the images along with the person's physical and verbal commentary relating to the images. In addition, the format of multimedia data object 104 allows a user to easily browse its contents while preserving the context and meanings associated with the person's interactions with the presented images 101.

Figure 11:
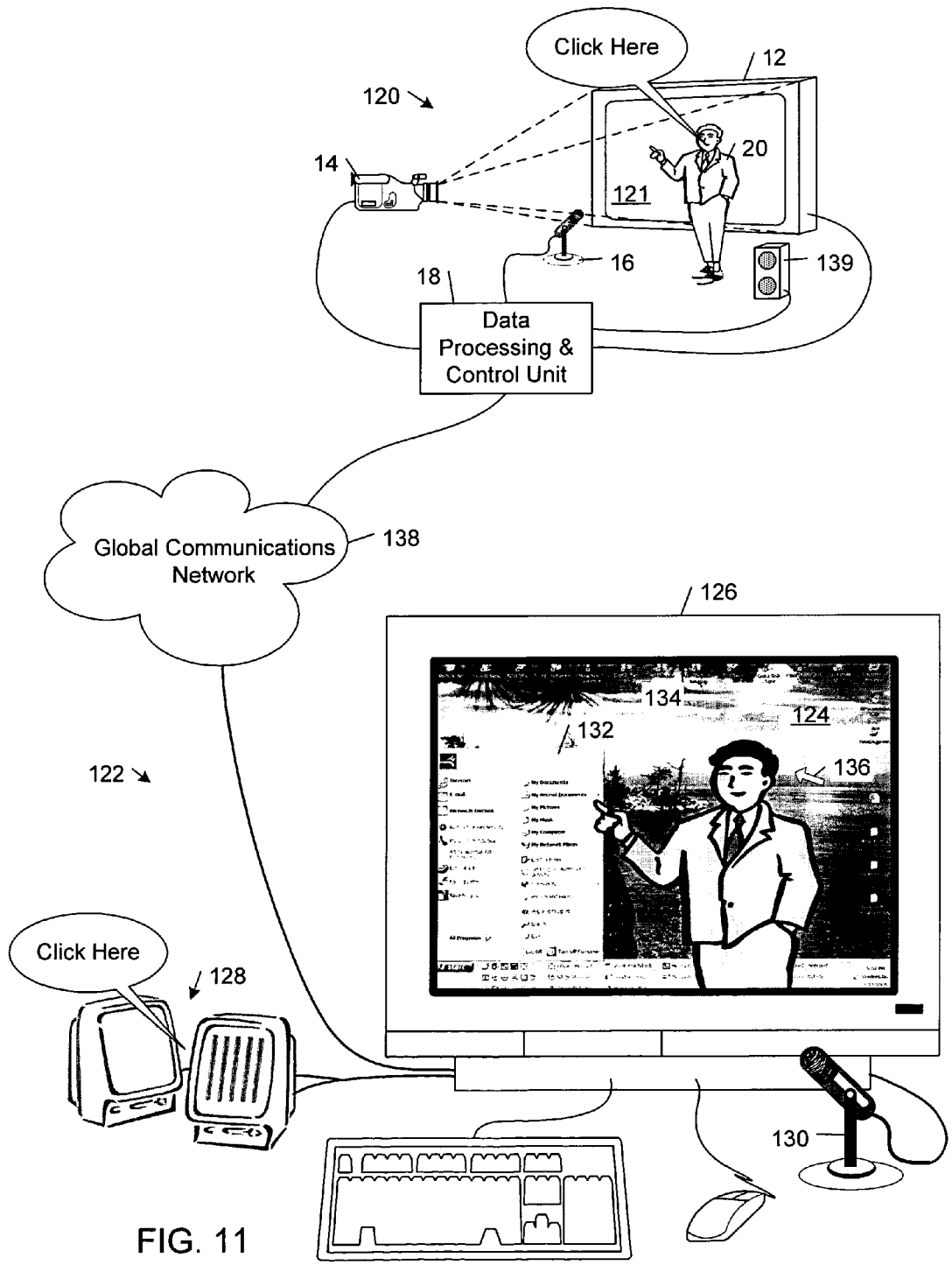
FIG. 11 is a diagrammatic view of an embodiment of an image-based media interaction capture system encapsulating a person's customer-support-related interactions with images of a graphical user interface presented on a display and transmitting the encapsulated interactions to a remote customer's multimedia data object presentation system.

FIG. 11 shows an embodiment of an image-based media interaction capture system 120 that is configured to encapsulate a person's customer-support-related interactions with images 121 of a graphical user interface 124 that are presented on the display 12. The image-based media interaction capture system 120 also is configured to transmit the encapsulated interactions to a remote customer's multimedia data object presentation system 122.

In this embodiment, the display 12 is a light-emitting screen that is controlled by the data processing and control unit 18. The multimedia object presentation system 122 is a desktop computer system that includes a monitor 126, a pair of speakers 128, and a microphone 130. The graphical user interface 124 is a windows-based graphical user interface that includes multiple windows 132, icons 134, and a pointer 136. The images 121 of the graphical user interface 124 and the multimedia data objects that are generated by the data processing and control unit 18 are transmitted between the data processing and control unit 18 and the customers multimedia data object presentation system 122 over a global communication network 138 (e.g., the internet).

In operation, the person 20 (e.g., a customer support person) interacts with images 121 of the remote customer's graphical user interface 124 that are presented on the display 12. For example, the person 20 may guide the remote customer through a series of steps for reconfiguring the remote customer's system 122. Because the person 20 can see the images 121 of the graphical user interface 124 on the display 12, the person is able to interact seamlessly with the presented images 121. For example, the person 20 can accurately describe and point to locations of interest synchronously with the different images 121 of the graphical user interface 124 that are presented on the display 12.

The image-based media interaction capture system 120 captures the person's interactions with the projected images 121 and encapsulates these interactions along with the presented images in a multimedia data object 104. In this process, the image segmentation module 46 segments the person's interactions from the images that are captured by the image recording device 14. The multimedia object generation module 48 incorporates into the multimedia data object 104 a presentation media object 106 that contains digital representations of the presented images 121, an image presence media object 108 that contains the segmented interactions with the presented images 121, and an audio presence media object 110 that contains a digital representation of the audio recordings captured by the audio recording device 16.

The resulting multimedia data object is transmitted to the remote customer's system 122 where one or more components of the multimedia data object are rendered. In this regard, the remote customer's system 122 superimposes the segmented images of the person's interactions onto the graphical user interface 124 that is presented on the monitor 126. The remote customer's system 122 also synchronously renders the sounds (e.g., "Click Here") that are encapsulated in the audio presence media object through the speakers 128. The remote customer's interactions with the graphical user interface 124 are encapsulated in multimedia data objects that are generated by a version of the data processing and control unit 18 that is executing on the remote customer's system 122. Any voice recordings that are captured by the microphone 130 also may be encapsulated in these multimedia data objects. The multimedia data objects that are generated by the remote customer's system are transmitted to the image-based media interaction capture system 120, where changes to the graphical user interface are reflected in the images presented on the display 12. Audio recordings that are encapsulated in the multimedia data objects that are generated by the remote customer's system may be rendered through a speaker 139 that is located near the person 20.

The embodiment of FIG. 11 allows the presence of the person 20 to be captured in a way that allows the remote customer's system 122 to accurately and flexibly render the person's presence on the remote customer. In this way, the remote customer can experience an enhanced sense of the person's presence that fosters the remote customer's trust of the person 20, a trust that oftentimes is needed in order for the remote customer to allow modifications to important and sensitive ones of the customer's tools and other resources.

Figure 12:
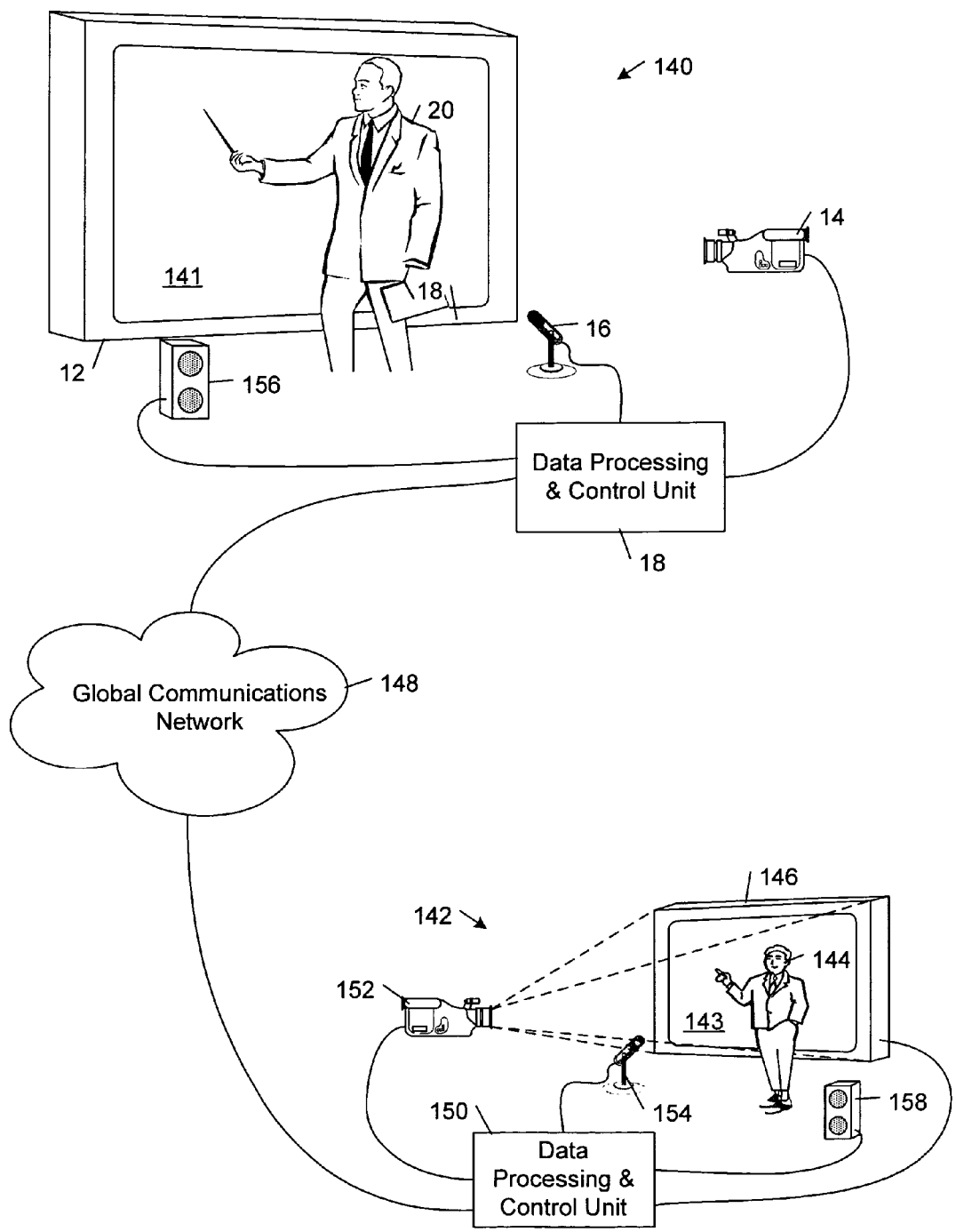
FIG. 12 is a diagrammatic view of an embodiment of two image-based media interaction capture systems encapsulating the interactions of multiple persons with a common set of images presented on multiple displays at different locations.

FIG. 12 shows an embodiment of two image-based media interaction capture systems 140, 142 encapsulating the interactions of multiple persons 20, 144 with a common set of images 141, 143 that are presented on multiple displays 12, 146 at different locations. Each of the image-based media interaction capture systems 140, 142 is configured to encapsulate a respective person's interactions with the images 141, 143 that are presented on the displays 12, 146. The image-based media interaction capture systems 140, 142 also are configured to transmit the encapsulated interactions to each other over a global communications network 148 (e.g., the internet). In this embodiment, each of the displays 12, 146 is a light-emitting screen that is controlled by a respective one of the data processing and control units 18, 150.

In operation, the persons 20, 144 interact with the images 141, 143 that are presented on the displays 12, 146. Because the persons 20, 144 can see the images presented on the displays 12, 146, the persons 20, 144 are able to interact seamlessly with the presented images.

The image-based media interaction capture systems 140, 142 capture the persons' interactions with the presented images 141, 143 and encapsulate these interactions along with the presented images 141, 143 in respective sets of multimedia data objects. In this process, the image segmentation modules 46 segment the persons' interactions from the images captured by the image recording devices 14, 152. The multimedia object generation modules 48 incorporate the following into the multimedia data objects: the presentation media objects that contain digital representations of the presented images 141, 143; the image presence media objects that contain the segmented persons' interactions; and the audio presence media objects that contain digital representations of the audio recordings that are captured by the audio recording devices 16, 154.

The image-based media interaction capture systems 140, 142 exchange and render the resulting multimedia data objects 104. In this regard, the segmented images of the persons' interactions are superimposed on the common set of images that are presented synchronously on the displays 12, 146. The image-based media interaction capture systems 140, 142 also synchronously render the sounds that are encapsulated in the audio presence media objects contained in the multimedia data objects through the speakers 156, 158. The image projection module 40 executed by the data processing and control units 18, 150 may include heuristics for rendering the segmented interactions of the persons 20, 144 in areas of the displays 20, 146 that overlap with areas that are obscured by the physical presences of the persons 20, 144.

After the persons' interactions have been captured and segmented, the multimedia data objects that are generated by the image-based media interaction capture systems 140, 142 can be merged into a single multimedia data object that contains the common set of presented images, the segmented interactions of both persons 20, 144, sound recordings, and at least one synchronization link. The embodiment of FIG. 12 allows the respective presences of the persons 20, 144 at different locations to be synchronously captured and merged into a single multimedia data object that enables observers to experience a joint presentation by the persons 20, 144 in a single unified way.

Other embodiments are within the scope of the claims.

What is claimed is:

1. A method, comprising:
   capturing images of a person's interactions with images presented on a display;
   segmenting the person's interactions from the presented images in the captured images; and
   generating a multimedia data object comprising a presentation media object containing digital representations of the presented images, an image presence media object containing the segmented interactions of the person, and at least one link synchronizing the presentation media object and the image presence media object.

2. The method of claim 1, wherein the capturing comprises capturing images of a capture area encompassing the display and at least a portion of the person's body in front of the display.

3. The method of claim 1, wherein the images are captured in a capture plane, and the segmenting comprises warping the presented images to the capture plane and comparing ones of the captured images with corresponding ones of the warped images.

4. The method of claim 3, wherein the segmenting additionally comprises identifying the person's interactions in the captured images as portions of the captured images different from comparable portions of corresponding ones of the warped images.

5. The method of claim 1, further comprising capturing an audio recording of the person's interactions with the presented images, and wherein the generating comprises incorporating in the multimedia data object an audio presence media object containing a digital representation of the audio recording, and at least one link synchronizing the audio presence media object and the image presence media object.

6. The method of claim 1, further comprising presenting the multimedia data object.

7. The method of claim 6, wherein the capturing comprises capturing the person's annotations to the presented images, and the presenting comprises synchronously presenting the images contained in the presentation media object and the segmented interactions of the person contained in the image presence media object and corresponding to the person's annotations.

8. The method of claim 6, wherein the capturing comprises capturing the person's customer-support-related interactions with images of a graphical user interface presented on the display, and the presenting comprises synchronously presenting the graphical user interface images contained in the presentation media object and the segmented interactions of the person contained in the image presence media object on a screen of the customer's computer.

9. The method of claim 8, further comprising presenting on the display interactions of the customer with the graphical user interface on the customer's computer.

10. The method of claim 6, wherein the presenting comprises synchronously presenting the images contained in the presentation media object and the segmented interactions of the person contained in the image presence media object on a second display.

11. The method of claim 10, further comprising capturing images of a second person's interactions with images presented on the second display, segmenting the second person's interactions from the images presented on the second display in the captured images, and merging the segmented interactions of the second person into the multimedia data object.

12. The method of claim 11, wherein the merging comprises warping the segmented interactions of the second person to a coordinate system shared with the images contained in the image presence media object.

13. The method of claim 1, further comprising transmitting the multimedia data object to a location remote from the display, and presenting the multimedia data object at the remote location.

14. The method of claim 1, wherein the segmenting comprises segmenting from the captured images image segments identified as corresponding to the person's interactions with the images presented on the display, and the generating comprises deriving the image presence media object from the image segments.

15. A machine-readable medium storing machine-readable instructions for causing a machine to perform operations comprising:
capturing images of a person's interactions with images presented on a display;
segmenting the person's interactions from the presented images in the captured images; and
generating a multimedia data object comprising a presentation media object containing digital representations of the presented images, an image presence media object containing the segmented interactions of the person, and at least one link synchronizing the presentation media object and the image presence media object.

16. The machine-readable medium of claim 15, wherein the images are captured in a capture plane, and the machine-readable instructions cause the machine to perform operations comprising warping the presented images to the capture plane and comparing ones of the captured images with corresponding ones of the warped images.

17. The machine-readable medium of claim 16, wherein the machine-readable instructions cause the machine to perform operations comprising identifying the person's interactions in the captured images as portions of the captured images different from comparable portions of corresponding ones of the warped images.

18. The machine-readable medium of claim 15, wherein the machine-readable instructions cause the machine to perform operations comprising presenting the multimedia data object.

19. The machine-readable medium of claim 18, wherein the machine-readable instructions cause the machine to perform operations comprising synchronously presenting the images contained in the presentation media object and the segmented interactions of the person contained in the image presence media object on a second display.

20. The machine-readable medium of claim 19, wherein the machine-readable instructions cause the machine to perform operations comprising capturing images of a second person's interactions with images presented on the second display, segmenting the second person's interactions from the images presented on the second display in the captured images, and merging the segmented interactions of the second person into the multimedia data object.

21. The machine-readable medium of claim 20, wherein the machine-readable instructions cause the machine to perform operations comprising warping the segmented interactions of the second person to a coordinate system shared with the images contained in the image presence media object.

22. The machine-readable medium of claim 15, wherein the machine-readable instructions cause the machine to perform operations comprising transmitting the multimedia data object to a location remote from the display, and presenting the multimedia data object at the remote location.

23. A system, comprising:
an image recording device operable to capture images of a person's interactions with images presented on a display; and
a processing system operable to
segment the person's interactions from the presented images in the captured images, and
generate a multimedia data object comprising a presentation media object containing digital representations of the presented images, an image presence media object containing the segmented interactions of the person, and at least one link synchronizing the presentation media object and the image presence media object.

24. The system of claim 23, wherein the images are captured in a capture plane, and the processing system is operable to warp the presented images to the capture plane and comparing ones of the captured images with corresponding ones of the warped images.

25. The system of claim 24, wherein the processing system is operable to identify the person's interactions in the captured images as portions of the captured images different from comparable portions of corresponding ones of the warped images.

26. The system of claim 23, wherein the processing system is operable to present the multimedia data object.

27. The system of claim 26, wherein the processing system is operable to synchronously present the images contained in the presentation media object and the segmented interactions of the person contained in the image presence media object on a second display.

28. The system of claim 27, wherein the image recording device is operable to capture images of a second person's interactions with images presented on the second display, and the processing system is operable to segment the second person's interactions from the images presented on the second display in the captured images and merge the segmented interactions of the second person into the multimedia data object.

29. The system of claim 28, wherein the processing system is operable to warp the segmented interactions of the second person to a coordinate system shared with the images contained in the image presence media object.

30. The system of claim 23, wherein the processing system is operable to transmit the multimedia data object to a location remote from the display, and presenting the multimedia data object at the remote location.

31. The system of claim 23, further comprising an audio recording device operable to capture an audio recording of the person's interactions with the presented images, and wherein the processing system is operable to incorporate in the multimedia data object an audio presence media object containing a digital representation of the audio recording, and at least one link synchronizing the audio presence media object and the image presence media object.

* * * * *